J. BYRNE.
GALVANIC BATTERY PLATES.
No. 183,748. Patented Oct. 31, 1876.
2 Sheets—Sheet 1.
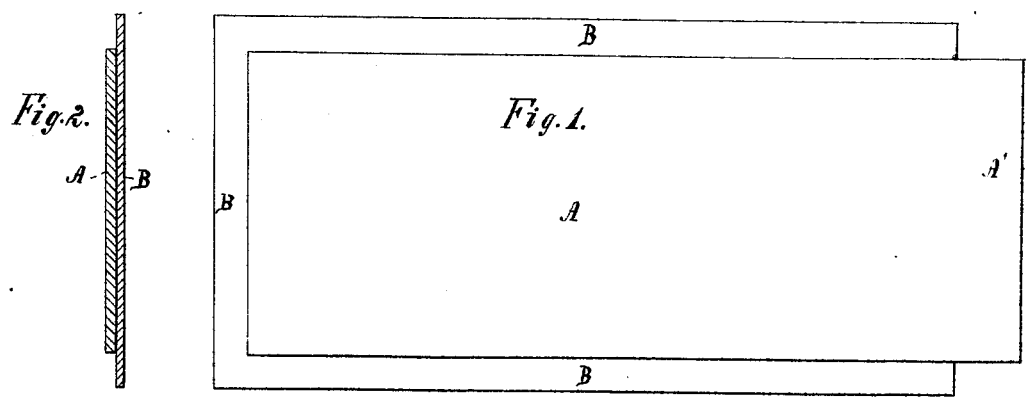
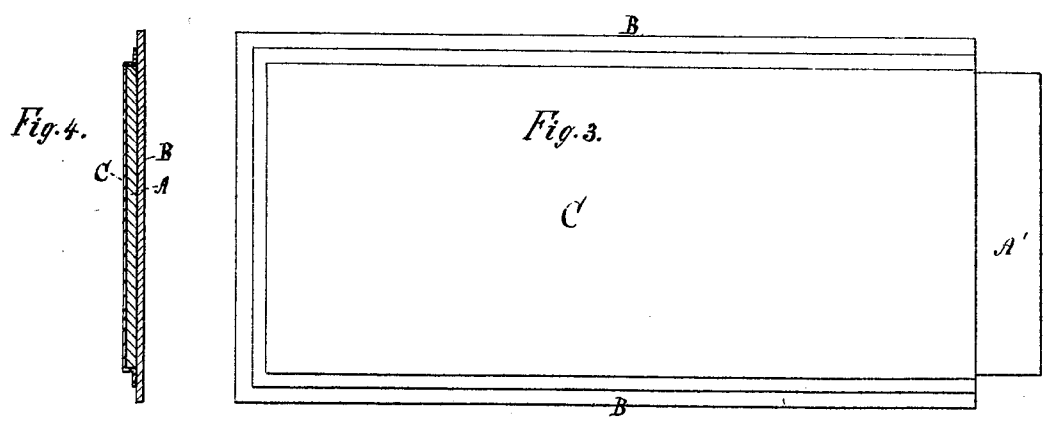
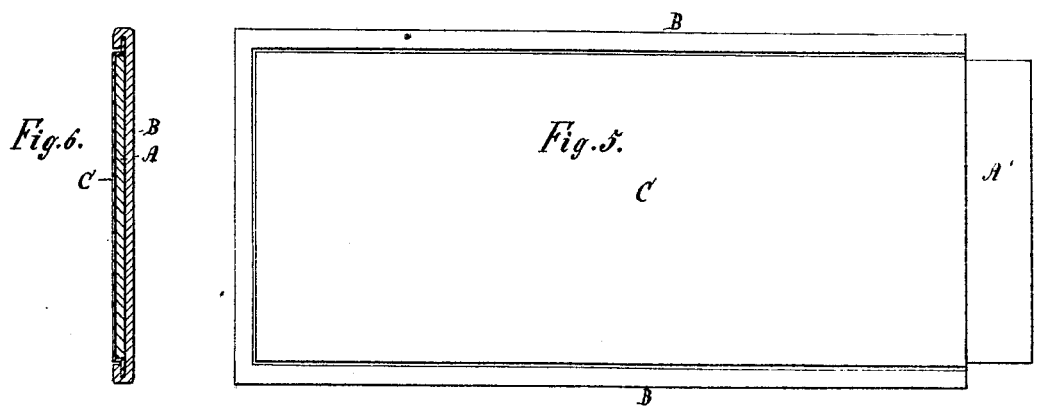
Witnesses:
Theodore Foster.
B. S. Clark.
Inventor:
John Byrne
By J. P. Fitch
his atty.

2 Sheets—Sheet 2.
J. BYRNE.
GALVANIC BATTERY PLATES.
No. 183,748. Patented Oct. 31, 1876.
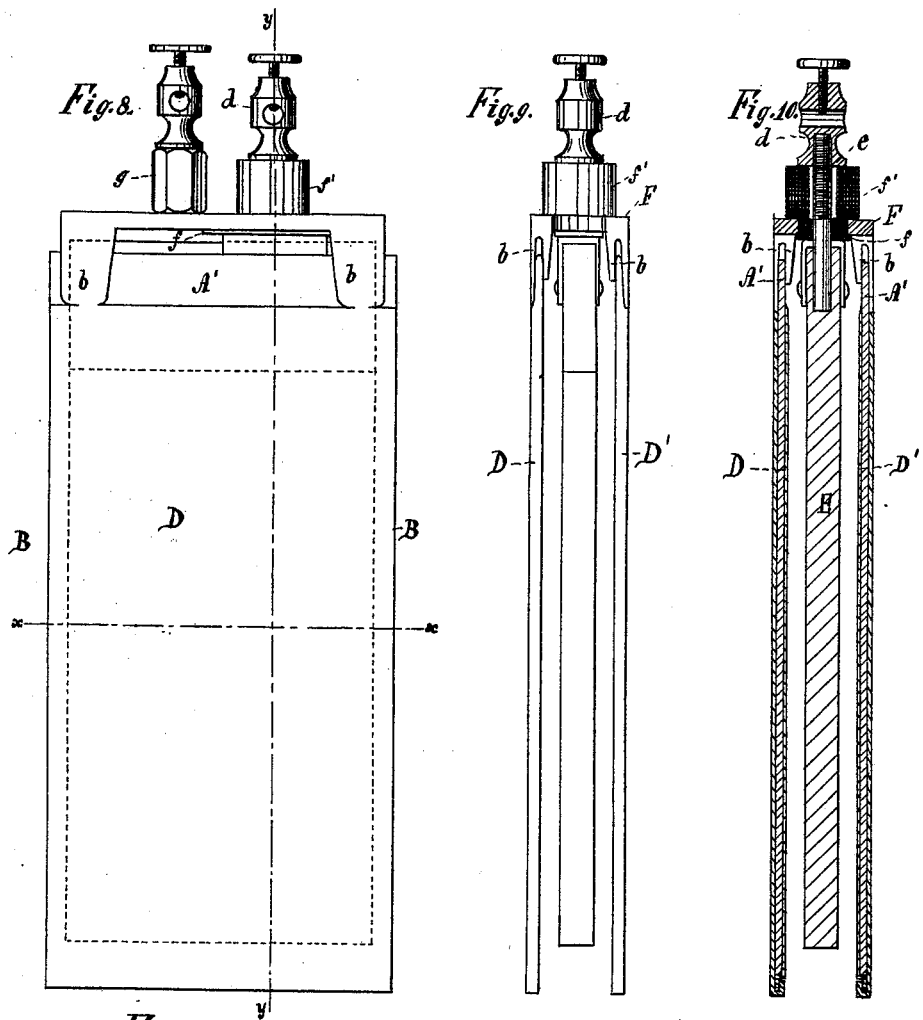
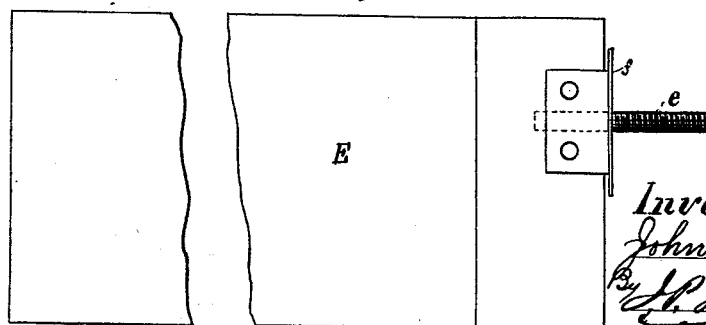
Witnesses:
Theodore Hoster
B. S. Clark
Inventor:
John Byrne
By H. P. Fitch
His Atty

UNITED STATES PATENT OFFICE.

JOHN BYRNE, OF BROOKLYN, NEW YORK.

IMPROVEMENT IN GALVANIC-BATTERY PLATES.

Specification forming part of Letters Patent No. 183,748, dated October 31, 1876; application filed July 18, 1876.

*To all whom it may concern:*

Be it known that I, JOHN BYRNE, of the city of Brooklyn, in the county of Kings, State of New York, have invented a new and useful Improvement in Negative Elements and Cells of Galvanic Batteries, of which the following is a specification, reference being had to the accompanying drawings, forming part of the same, in which—

Figure 1 is a face view of a sheet of copper backed by a plate of lead, which enters into the composition of my new negative element, and Fig. 2 is a cross-section of same. Fig. 3 is a face view of the same, with a thin plate or foil of platinum laid upon the face of the copper, and Fig. 4 is a cross-section of the same. Fig. 5 is a face view of same, with the edges of the lead folded over upon the edges of the platinum, and Fig. 6 is a cross-section of same. Fig. 7 is a cross-section of a similar combination of plates, showing another mode of folding the lead at the edges to protect the copper. Fig. 8 is a side view, and Fig. 9 an edge view, of my improved cell. Fig. 11 is a cross-section of the same on line $x\,x$, Fig. 8; and Fig. 10 a longitudinal section of same on line $x\,x$, Fig. 8. Fig. 12 is a side-face view (broken to shorten the figure) of the zinc element of my improved cell.

My invention relates to negative elements of galvanic batteries that are composed of a core, having high conducting-power, combined with a surface formed of an extreme negative metal; and consists, first, in the combination, in the composition of a negative element, of a copper core, faced on one side with platinum, and upon the other side with lead, the copper being by both facings completely enveloped and protected from attack by the battery-fluid; and, second, in the galvanic cell, hereinafter described, composed of two of my improved negative plates, with a zinc plate placed between the opposing platinum faces of said plates.

The construction of my improved negative plate is as follows: I prepare a copper plate of suitable dimensions—say, about two and a half by five inches, and eighteen gage. One face of this I cover with lead—say, two and a half pounds per square foot—and solder it to the copper. The edges of the lead should project—say, one-fourth of an inch—beyond the copper at the side edges and at one end. This projection I double over upon itself, folding the edges of the lead down by the edges of the copper, so as to bring the lead flush with the copper on the uncovered side of the latter. Then I spread and solder a thin plate or foil of platinum over the uncovered face of the copper, allowing it to extend to the folded edges of the lead, thus making a plate, one face of which is lead and the opposite face platinum, the two inclosing a copper plate, and completely protecting it from the battery-fluid. The lead is proof against attack from bichromate fluid or dilute sulphuric acid. To render it proof against other fluids which it may be desirable to use, the lead may be coated with asphaltum-varnish.

In place of the platinum, gold plate or foil may be used, which may be sweated to the copper, and then rolled or deposited in a heavy coat, and subsequently rolled.

One special advantage of this combined copper, lead, and platinum plate is that a cell formed by two of them, with a zinc plate between the platinum faces, has no portion of either the positive or negative elements exposed to the action of the battery-fluid, excepting those surfaces directly opposite to each other, thus obviating any unutilized expenditure of material or force.

Such a cell, exposing twenty-two square inches of surface immersed in bichromate fluid, I find gives by actual test an electro-motive force of 1.99 volts., and an internal resistance of only about 0.06 ohms.

Four cells, same as above, exposing twenty-two inches of surface in each in dilute sulphuric acid, have been practically tested for electro-plating, and it is found that these four cells will do as much work as six Smee cells in good condition, exposing eighty-four square inches of surface in each cell.

The electric light has also been extensively experimented with, and repeated observations warrant the statement that thirty of these cells in series, the exciting fluid being one volume of sulphuric acid to four or five of water, and one-third the ordinary proportion of bichromate of potassa—say, five or six ounces to each gallon—will give a larger luminous disk than fifty ordinary Bunsen or Grove cells, and an equally intense light. From the fact also that, in liquid of the above strength, hydrogen is actively liberated, no agitation is needed to insure steady and continuous action.

The same letters refer to similar parts in the several figures.

A represents the copper plate, and B a plate of lead, the end projecting beyond the lead, as seen at A', for attachment to the battery-wire. In Fig. 7, cross-section, the same parts are represented with the edges of the lead plate turned over upon themselves, so as to be flush with the uncovered face of the copper A. C is the platinum plate or foil, covering the face of the copper opposite to that covered by the lead. The several cross-sections of these plates show various ways in which the edges of the lead and foil may be folded over the edges of the lead, so as to protect it. In the figures representing the organized cell, D D' are two combined metal negative plates, the outer faces being lead, preferably coated with asphaltum-varnish, and the inner faces being platinum. E is the zinc plate, suspended between the plates D D'. F is a head-clamp, into the lip b of which the upper end A' of the copper cores of the plates D D' are secured. The zinc plate E is secured to the head F by the screw d and nut e, which serves also as a binding-screw, and is insulated from the said head by the rubber plate and washer f and f'. g is a binding-screw secured in the head E, and is thus in metallic connection with the copper plate A. As is obvious, the circuit is established by a wire connecting the two binding-screws.

The principle upon which the negative element, above described, is constructed, is obvious. The copper core or plates constitutes a medium of high conductivity for the transmission of the galvanic current metallically connected with a compact plate or foil of platinum, which, as is well known, is one of the most electro-negative of metals. By this combination I secure the advantage of the minimum of resistance, and the maximum of galvanic action; but the mere combination of these two metals is not in this application a novelty. It is described and claimed by me in a previous application, which has been passed for issue. In the said previous application, however, the copper is described as completely enveloped by the platinum, the platinum being thus exposed on both faces of the plate. I now combine with the copper and platinum a third element, namely, a lead backing covering one face of the platinum, leaving only the face opposite the said lead backing exposed to the battery-fluid, and my present claim as to the said plate is to be limited to the combination of the said three elements, the copper, the platinum, and the lead, as described; but I do not, of course, intend to be confined to the specific metals named. My claim extends to their respective equivalents, the principle being to combine with a core of high conductivity a metal of extreme negative quality covering one face of the copper, and a backing covering the opposite face of the copper of lead, or some analogous protecting or electro-chemical passive substance.

I claim as my invention—

1. The negative element of a galvanic battery, composed of a central core of copper, covered on one face with lead, and on the other with compact adherent coating of platinum, as and for the purpose described.

2. A galvanic-battery cell, composed of two negative plates, each formed of copper, backed with lead, and faced by platinum, with a zinc plate placed between the opposite platinum faces, as and for the purpose described.

Witness my hand this 13th day of July, 1876.

JOHN BYRNE.

Witnesses:
B. S. CLARK,
A. S. FITCH.